3,694,171
METHOD FOR PURIFYING CYCLIC PHOSPHONITRILIC CHLORIDES
Harry Dreifus, Lewiston, N.Y., assignor to Hooker Chemical Corporation, Niagara Falls, N.Y.
Filed Feb. 2, 1970, Ser. No. 7,658
Int. Cl. C01b 21/52, 25/10
U.S. Cl. 423—300                 15 Claims

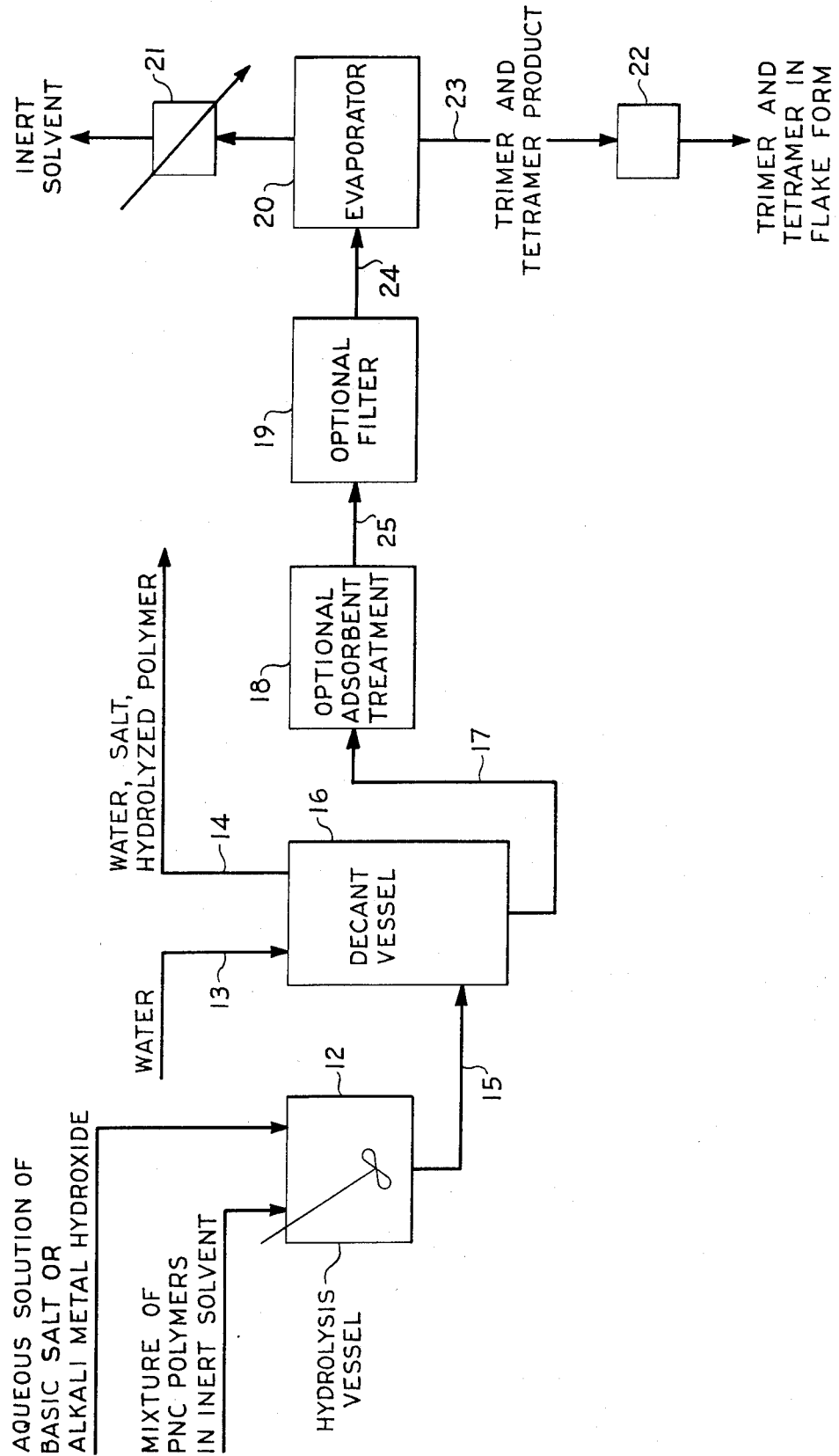

ABSTRACT OF THE DISCLOSURE

In the production of phosphonitrilic chlorides by the reaction of phosphorus pentachloride and ammonium chloride in a solvent inert to chlorination by use of a process involving the slow addition of at least a major proportion of the phosphorus pentachloride to the ammonium chloride during a period of time corresponding to about 50 to 100 percent of the total time during which the reaction takes place, the proportion of trimeric phosphonitrilic chloride is greatly increased by the addition of a solution of alkali metal hydroxide or basic salt to the reaction mixture upon completion of the reaction and decantation of the watery phase prior to removal of solvent by distillation.

BACKGROUND OF THE INVENTION

This invention relates to improvements in a method of manufacture of phosphonitrilic chloride polymers whereby a high yield of the lower cyclic phosphonitrilic chloride polymers is obtained.

Cyclic phosphonitrilic chloride polymers are valuable for example as constituents of thermally resistant resins as disclosed more fully in U.S. Pat. No. 2,866,773, and as intermediates for insecticidally active compounds as disclosed more fully in U.S. Pat. No. 2,858,306. As is already known, the trimer is the most useful for these purposes. The trimer is of particular value for use in reactions with phenolic compounds to produce resins since the higher polymers may give rise to too great a degree of cross-linking. Moreover, the trimer is the easiest of the cyclic polymers to separate in pure form.

In our co-pending application Ser. No. 871,406, filed Sept. 15, 1969, a process is described for the production in high yield of lower phosphonitrilic chloride polymers particularly the trimer wherein there is provided a method which comprises the addition of phosphorus pentachloride to at least an equimolecular proportion of ammonium chloride in a hot solvent at least the major part of the phosphorus pentachloride being added slowly and evenly over the major part of the period of time during which reaction takes place whereby a high yield of lower cyclic polymers, especially the trimer, is produced.

The formation of polymeric phosphonitrilic chlorides has been described in "Berichte" 57B 1343 (1924) by Schenk and Romer. The method of formation described is the reaction of phosphorus pentachloride with ammonium chloride. This reaction is brought about by refluxing the two compounds in an inert solvent, the solvent used being tetrachloroethane. Other solvents which have been used are chlorobenzene, orthodichlorobenzene and benzyl chloride. After reflux and when the reaction was proceeded substantially to completion, a mixture of polymers is obtained, this mixture consisting of (a) cyclic phosphonitrilic chloride polymers $(PNCl_2)_n$, where $n$ is an integer of 3 or more and (b) linear $PNCl_2$ chains end-blocked with the elements of phosphorus pentachloride and of the probable formula $(PNCl_2)_n PCl_5$.

Typical proportions, expressed as percentages by weight, of the two types of polymer obtained by this method, are 75–85% of the cyclic polymers and 15–25% of the linear polymers of general formula $(PNCl_2)_n PCl_5$, wherein $n$ is an integer of 5 or more. Furthermore, the proportions of the individual cyclic polymers found in the crude mixture of cyclic and linear polymers are approximately 25–35% of the trimer $(PNCl_2)_3$, 10–20% of the tetramer $(PNCl_2)_4$ and 30–40% of the higher cyclic polymers, the percentages of the various polymers being expressed as percentages by weight. Yields of the crude mixture are generally of the order of 95–99% based on the $PCl_5$ used. The proportions of the two types of polymer may be varied to some extent by varying the amount of phosphorus pentachloride and ammonium chloride used.

The mixture of cyclic polymers may be separated in various ways, among them:

(a) fractional distillation under reduced pressure as first described by Stokes in American Chem. J. (1897), 19, 782.

(b) fractional crystallization e.g. from petroleum ether or benzene.

(c) acid extraction as described in Pat. No. 3,008,799.

All three methods for separation of individual cyclic polymers are described in J. Chem. Soc. (1960), 2542 (L. G. Lund, N. L. Paddock, J. E. Proctor and H. T. Searle). The present invention is not concerned with these methods of separation, but with a method of separating the higher cyclic and linear polymers present in the product by means of their greater susceptability to hydrolysis as compared to that of the desired lower cyclic polymers. A method of analysis was devised which takes advantage of the differences in infra-red spectra shown by individual cyclic polymers. These differences are indicated in papers by Daasch, J. Amer. Chem. Soc. (1954), 76, 3403; Krause, Z. Electrochem. (1955), 59, 1004 and Shaw, Chem. and Ind. (1959), 54. Absorption peaks at 8.22 microns (1218 cm.$^{-1}$) and 12.67 microns (790 cm.$^{-1}$) are used for estimation of the amounts of trimeric and tetrameric phosphonitrilic chlorides respectively in a carbon disulfide solution of thee mixture of cyclic polymers, the proportions varying with the respective peak heights at these wavelengths. The proportion of higher cyclic polymers then follows by difference or by similar correlation with peak heights at the appropriate wavelengths.

SUMMARY OF THE INVENTION

It is the object of this invention to provide a method of improving the purity of phosphonitrilic chloride polymers namely the trimer and tetramer by the addition of a solution of a hydrolyzing agent such as alkali metal hydroxide or basic salt to the product obtained by reacting ammonium chloride and phosphorus pentachloride. The addition of the aqueous solution of alkali metal hydroxide or salt of a strong alkali and a weak acid is believed to cause the hydrolysis of the 4, 5, 6 cyclic and higher polymers of phosphonitrilic chloride so as to render them water soluble and thus allow their removal in the water layer. Removing linear polymers is further beneficial because they are believed to act as polymerization catalysts for the lower polymers of phosphonitrilic chloride so as to cause them to polymerize upon heating at 125 degrees centigrade during the organic solvent removal process. That the higher linear polymers of phosphonitrilic chloride act as polymerization catalysts only during the evaporation step in purification is believed to be because of the higher concentration of the polymers in the organic solvent namely monochlorobenzene as evaporation of solvent proceeds. At the lower concentration of polymer during the reaction at reflux temperature, the linear polymers do not act as polymerization catalysts in the same degrees.

DESCRIPTION OF PREFERRED EMBODIMENTS

The hydrolyzing agents used in this invention may be sodium hydroxide, potassium hydroxide, lithium hydroxide or their salts with weak acids such as sodium carbonate or sodium acetate. Ammonium hydroxide may also be used. For the purposes of this invention all that is required of the hydrolyzing agent is that it be able to provide —OH ions in solution which are believed to promote the hydrolysis of the higher cyclic and linear polymers of phosphonitrilic chloride. Other anions which may be used with the above alkali metal cations are: phosphate, borate, benzoate, propionate, butyrate, isobutyrate, valerate and caproate. Where the salts of these alkali metal hydroxides are used it may be necessary to increase the concentration to provide comparable activity as compared to the alkali metal hydroxide itself. The activity of the hydrolyzing agents increases as would be expected with a rising temperature. Normally the treatment is conducted at room temperature (25° C.) up to a temperature of about 35° C. The addition of the alkali metal hydroxide causes a small exotherm upon addition and it is found that elevated temperatures do not result in increases in trimer purity but rather in a reduction in yield, thus indicating that higher temperatures promote the hydrolysis of the trimer and the tetramer of phosphonitrilic chloride. It appears that at the lower temperatures used in the process of this invention that optimum hydrolysis occurs to provide solubility of the higher cyclic and linear polymers of phosphonitrilic chloride so as to allow their separation in the aqueous phase.

According to the invention there is provided a process for the production of cyclic phosphonitrilic chloride polymers which comprises the reaction at a temperature between 10–50° C., preferably 20–35° C. of an alkali metal hydroxide or the salt of a strong alkali and a weak acid with a crude solution of lower cyclic polymers containing excess unreacted ammonium chloride, higher cyclic, and linear polymers in a solvent having a high dielectric constant which is inert to chlorination and boils between 1000 degrees and 160 degrees centigrade. Preferred solvents are monochlorobenzene and orthodichlorobenzene. The $PNCl_2$ polymer is generally prepared in solution at a temperature of at least 100 degrees centigrade and preferably at the boiling point of the reaction mixture, the reaction being carried out under reflux.

The aqueous solution of alkali metal hydroxide or basic salt can be slowly added to the slurry left in the reactor at the completion of the reaction. Agitation is continued for about 1 hour after all the alkali metal hydroxide solution has been added. The treatment is effected at 20–35° C. and causes a small exotherm. The agitation is stopped upon completion of the reaction and the layers are allowed to settle. A small amount of water added at this time to the alkali metal hydroxide or basic salt solution contributes to the speed and cleanness of the separation by decantation. The aqueous layer containing the unreacted ammonium chloride and soluble phosphonitrilic chloride residues derived from the higher cyclic polymers is decanted. Optionally activated charcoal may then be added to the remaining heavier layer containing inert organic solvent and phosphonitrilic chloride polymers mainly as a means of improving color. Treatment with the charcoal is continued for 1 hour at 25–35° C., a filter aid is then added and the activated charcoal is filtered off. The solvent is finely evaporated yielding a white, non-oily, crystalline, trimer and tetramer enriched phosphonitrilic chloride polymer of the formula $(PNCl_2)_n$ where $n=3$ or more.

DESCRIPTION OF DRAWING

My invention is shown schematically in the accompanying figure. A mixture of phosphonitrilic chloride polymers in an inert solvent solution is charged to an hydrolysis vessel 12 and an aqueous solution of alkali is added. The mixture is allowed to react under agitation after which the mixture is led into decanting vessel 16 through conduit 15. Additional water is added to the mixture so as to accentuate the differences in specific gravity of the aqueous and the organic solvent phases so as to allow easier separation of the two layers which is effected by drawing off the lighter aqueous layer through conduit 14. This layer consists of water, salt, and hydrolyzed phosphonitrilic chloride polymer. The lower heavier organic layer is drawn off through conduit 17 into zone 18 where an adsorbent material may be optionally added to the mixture. After allowing time for the adsorbent material to act, a filter aid is then added and the mixture led through conduit 25 to evaporator vessel 20 wherein the temperature is raised and the pressure is lowered below atmospheric so as to remove the organic solvent from the trimer and tetramer products. The organic solvent is passed through condenser 21 as a vapor and therein recovered as a liquid solvent. The said trimer and tetramer product passes to a flaker 22 where the product is cast into flakes.

After the reaction of ammonium chloride and phosphorus pentachloride at elevated temperature the mixture is cooled and a solution of alkali metal hydroxide is added while agitation continues and the hydrolysis reaction which takes place is allowed to continue over a period of several minutes to several hours. Where high concentrations of alkali metal hydroxide are used, the comparative difference in specific gravity of the two liquids may be accentuated by adding water to reduce the specific gravity of the aqueous layer. Upon completion of the reaction, the mixture is allowed to stand so as to allow the layers to form and these are then drawn off by decantation. The aqueous layer contains water, salt, and hydrolyzed polymer.

After the trimer and tetramer of phosphonitrilic chloride are separated from the polymer solution by means previously discussed it is convenient to chill and flake said molten products. This may be accomplished by thinly spreading out the said product on a cooled moving inert surface and by removing the solidified product from the surface by a scraping means, said chilling and baking means may be embodied in conventional flaker units utilizing an internally cooled revolving drum and a stationary breaker bar set very close to the surface of said drum.

Efficiency of this invention is maintained even though the equipment available, operating conditions and process economics change by recirculating the polymer solution emerging from the decanting zone until the polymer concentration has been increased several fold before the solution proceeds to the evaporator. A suitable polymer concentration is 15 percent although polymer concentrations in the range of 10 to 35 percent may be used without difficulty.

The following examples serve to illustrate the manner in which the invention may be carried into effect. In all the examples a crude mixture of linear and cyclic phosphonitrilic chloride polymers was produced by a method which comprises bringing into contact phosphorous pentachloride and ammonium chloride in an inert solvent consisting of monochlorobenzene at reflux temperature, the phosphorus pentachloride being present at any time during the reaction in a proportion which is in a molecular excess of at least 10 percent of the ammonium chloride which is in a state of division such that its specific surface is at least 1,000 square centimeters per gram. Only the method of purification of the crude phosphonitrilic chloride polymers differs from the method of said copending application.

EXAMPLE 1

350 grams of monochlorobenzene were charged to a flask equipped with means of agitation. Hydrogen chloride and ammonia addition were started under agitation. 12 grams of ammonia and 75 grams of hydrogen chloride were added over a 3 hour period to produce a slurry containing 32.7 grams of ammonium chloride. Dried magnesium chloride to the extent of 2 grams was added as a catalyst at this time. The contents of the flask containing ammonium chloride and monochlorobenzene were heated to reflux and a hot solution of 100 grams of phosphorus pentachloride in 200 grams of monochlorobenzene were added over a period of 2 hours. The reaction mixture was allowed to reflux for 3 hours more to complete the reaction. The contents of the flask at this point were split into 2 portions labeled portion A and portion B. Portion A is described for the purposes of illustration only and forms no part of this invention. With 254.3 grams of portion A a filtrate was obtained containing a yield of 243.3 grams which upon evaporation to dryness gave 22.3 grams of phosphonitrilic chloride. To 370.2 grams of portion B at 21° C. were added 200 grams of a 10 percent aqueous sodium hydroxide solution and treatment was continued under agitation at room temperature for 1 hour during which an exotherm of about 10° C. was noted. At the end of this time, 50 cubic centimeters of water were added and the solution was allowed to settle. The aqueous layer being lighter was decanted and the remaining organic layer was evaporated to a dryness to yield 20.6 grams of phosphonitrilic chloride. Analysis of the product on a percentage weight basis showed the following:

|   | Percentage | | | |
| --- | --- | --- | --- | --- |
|   | Trimer | Tetramer | Residue | Monochlorobenzene |
| A | 60 | 33.0 | 4.3 | 0.3 |
| B | 75.3 | 15.8 | 0.2 | 0.7 |

These results illustrate that a significantly decreased percentage of residue is obtained when the process of this invention is followed and that the yield of the most desirable component, the trimer, is significantly increased while the yield of the tetramer is proportionately decreased.

EXAMPLE 2

350 grams of monochlorobenzene were charged to a flask equipped with means of agitation. Hydrogen chloride and ammonia addition were started under agitation. 12 grams of ammonia and 63 grams of hydrogen chloride were added over a period of 3½ hours to yield 37 grams of ammonium chloride. No catalyst was added to this run as distinguished from the run illustrated in Example 1. The flask containing monochlorobenzene and ammonium chloride was heated to reflux and a hot solution of 100 grams of phosphorus pentachloride in 200 grams of monochlorobenzene was added over a period of 5 hours. Reflux was continued for 2 hours after phosphorus pentachloride addition was complete. At this point, the contents of the flask were cooled and divided into 2 portions: Portion A, forming no part of this invention but included in this example for comparison purposes only, and consisting of 279.9 grams of reactor product was filtered to yield 251 grams of filtrate which upon evaporation yielded 21.1 grams of phosphonitrilic chloride. Portion B, at 20° C. consisting of 348.3 grams of reactor product, was treated for 1 hour at room temperature with 200 grams of a 10 percent aqueous solution of sodium hydroxide which caused an exotherm of about 10° C. The layers were then allowed to settle and the inorganic layer decanted leaving the remaining heavier organic layer consisting of 317.6 grams which was then evaporated to dryness yielding 19.8 grams of phosphonitrilic chloride. Analysis of these products on a weight basis showed the following:

|   | Percentage | | | |
| --- | --- | --- | --- | --- |
|   | Trimer | Tetramer | Residue | Monochlorobenzene |
| A | 66.4 | 14.2 | 2.6 | 0.3 |
| B | 80.7 | 7.5 | 0.3 | 1.2 |

The above example shows the significant reduction in residue obtained by the process of this invention.

EXAMPLE 3

350 grams of monochlorobenzene were charged to a flask equipped with means of agitation. Hydrogen chloride gas and ammonia gas addition were started under agitation. 12 grams of ammonia and 50 grams of hydrogen chloride were added over a 3 hour period to produce a slurry containing 36.5 grams of ammonium chloride. Dried magnesium chloride (2.0 grams) were added at this point as a catalyst. The flask containing monochlorobenzene and ammonium chloride were heated to reflux at this point and a hot solution of 100 grams of phosphorus pentachloride in 200 grams of monochlorobenzene was added over a period of 5 hours. The reaction batch was refluxed for 3 hours after the completion of the above addition. At this point the contents of the flask were cooled and divided into 2 portions. Portion A, forming no part of this invention but included for the purposes of comparison only, consisting of 257 grams of reactor product was filtered to yield 247.9 grams of filtrate which upon evaporation to dryness yielded 21.5 grams of phosphonitrilic chloride. Portion B, consisting of 355 grams of reactor product, was treated for 1 hour at room temperature with a 10 percent aqueous sodium hydroxide solution causing an exotherm from about 21° C. to 33° C. The layers were allowed to settle and the inorganic layer decanted. The remaining organic layer was evaporated to dryness to yield 19.5 grams of phosphonitrilic chloride. Analysis of these products on a percentage by weight basis showed the following:

|   | Percentage | | | |
| --- | --- | --- | --- | --- |
|   | Trimer | Tetramer | Residue | Monochlorobenzene |
| A | 67.2 | 16.7 | 12.2 | 0.3 |
| B | 82.8 | 4.4 | 0.3 | 0.6 |

It should be noted that the above analysis by weight was done using the method of infrared analysis to determine the proportions of cyclic trimer and cyclic tetramer in the phosphonitrilic chloride polymers obtained in the above examples. The linear polymer content was determined by solvent extraction of the mixed polymers of the phosphonitrilic chlorides.

Various changes and modifications may be made in the method and apparatus of this invention without departing from the spirit and scope of this invention. These modifications are to be regarded as within the scope and purview of this invention.

What is claimed is:

1. A process which comprises contacting a solution of phosphonitrilic chloride polymers comprising linear polymers, cyclic trimer, cyclic tetramer, and higher cyclic polymers, in an inert solvent with an aqueous solution of a hydrolyzing agent able to provide —OH ions in solution, and separating the resultant solution of phosphonitrilic chloride polymers consisting essentially of cyclic trimer and cyclic tetramer from the aqueous phase.

2. The process of claim 1 wherein the hydrolyzing agent is selected from the group consisting of an alkali metal hydroxide and the salt of a strong base and a weak acid.

3. A process according to claim 1 wherein the hydrolyzing agent is an alkali metal hydroxide, the cation of which is selected from the group consisting of sodium, potassium, and lithium.

4. A process according to claim 1 wherein the hydrolyzing agent is a basic salt of a strong base and a weak acid, the cation of which is selected from the group consisting of sodium, potassium and lithium.

5. A process according to claim 3 wherein the alkali metal hydroxide solution contains from about between 5 to 50% alkali metal hydroxide.

6. A process according to claim 2 wherein the proportion of hydrolyzing agent used is from about 30 to 70% of the polymer solution.

7. A process according to claim 3 wherein the alkali metal hydroxide is used in the proportion of about 50% of the polymer solution.

8. A process according to claim 3 wherein the hydrolyzing agent is sodium hydroxide.

9. A process according to claim 1 which comprises contacting a solution of said phosphonitrilic polymers in an inert solvent with an aqueous solution of an alkali metal hydroxide at about 10° to about 50° centigrade and separating the resulting polymer solution from the aqueous phase.

10. A process according to claim 1 which comprises contacting a solution of said phosphonitrilic polymers in an inert solvent selected from the group consisting of monochlorobenzene and orthodichlorobenzene with an aqueous solution of a hydrolyzing agent selected from the group consisting of an alkali metal hydroxide and the basic salt of a strong base and a weak acid and separating the resulting aqueous phase from the polymer solution and recovering at least 75 percent pure phosphonitrilic chloride trimer.

11. A process which comprises contacting a solution of phosphonitrilic chloride polymers in monochlorobenzene as a solvent with an aqueous solution of sodium hydroxide and separating the resulting aqueous phase from the polymer solution.

12. A process according to claim 1 wherein phosphonitrilic chloride polymer is produced by reacting phosphorus pentachloride and ammonium chloride by the addition of phosphorus pentachloride to at least an equimolar proportion of ammonium chloride in an inert solvent, at least the major part of the phosphorus pentachloride being added slowly and evenly over the major part of the period of time during which reaction takes place, followed by contacting the resulting reaction mixture with an aqueous solution of a hydrolyzing agent able to provide —OH ions in solution, and separating the resultant solution of phosphonitrilic polymers consisting essentially of cyclic trimer and cyclic tetramer from the aqueous phase.

13. A process according to claim 1 wherein the hydrolyzing agent is ammonium hydroxide.

14. In a process wherein phosphonitrilic chloride polymer is produced by reacting phosphorus pentachloride and ammonium chloride by the addition of phosphorus pentachloride to at least an equimolar proportion of ammonium chloride in an inert solvent, at least the major part of the phosphorus pentachloride being added slowly and evenly over the major part of the period of time during which reaction takes place, followed by separating the resulting trimeric and tetrameric phosphonitrilic chloride, the improvement comprising contacting the resulting reaction product in an inert solvent with an aqueous solution of a hydrolyzing agent able to provide —OH ions in solution, and separating the resultant polymer solution consisting essentially of trimeric and tetrameric phosphonitrilic chloride from the aqueous phase.

15. A process according to claim 1 wherein the inert solvent comprises a solvent which is inert to chlorination and boils between 100 degrees and 160 degrees centigrade.

References Cited
UNITED STATES PATENTS

| | | | |
|---|---|---|---|
| 2,749,233 | 6/1956 | Malowan | 23—357 |
| 2,862,799 | 12/1958 | Dittmar et al. | 23—357 |
| 3,442,629 | 5/1969 | Jaszka | 23—357 |
| 3,347,643 | 12/1959 | Nielsen | 23—357 |

EARL C. THOMAS, Primary Examiner

H. S. MILLER, Assistant Examiner

U.S. Cl. X.R.

423—302, 371